United States Patent [19]
Weber

[11] 3,826,516
[45] July 30, 1974

[54] FIFTH WHEEL MOUNTING STRUCTURE
[75] Inventor: Charles A. Weber, Elkhart, Ind.
[73] Assignee: Bock Products, Inc., Elkhart, Ind.
[22] Filed: Apr. 5, 1973
[21] Appl. No.: 348,198

[52] U.S. Cl............ 280/407, 280/423 R, 280/490 R
[51] Int. Cl............................................. B62d 53/08
[58] Field of Search............ 280/407, 423 R, 423 B, 280/438 R, 438 A, 490 R

[56] References Cited
UNITED STATES PATENTS

| | | | |
|---|---|---|---|
| 2,925,286 | 2/1960 | Hodges et al. | 280/423 R |
| 3,164,399 | 1/1965 | Lugash | 280/423 R |
| 3,269,751 | 8/1966 | Whattoff | 280/490 R |
| 3,336,051 | 8/1967 | Dale | 280/423 R |
| 3,392,992 | 7/1968 | Baker et al. | 280/423 R |
| 3,527,476 | 9/1970 | Winckler | 280/423 R |
| 3,584,899 | 6/1971 | Gottler | 280/407 |

Primary Examiner—Leo Friaglia
Assistant Examiner—Randall A. Schrecengost
Attorney, Agent, or Firm—Hobbs & Green

[57] ABSTRACT

A fifth wheel mounting structure for connecting a trailer such as a recreational vehicle and a pick-up truck having a bed thereon, in which a frame mounted on the bed has a fifth wheel platform thereon for receiving the fifth wheel pin extending downwardly from the forward end of the trailer. The frame is adjustable in height and in forward and rearward positions in the bed in order to properly distribute the weight on the wheels of the two vehicles and over the rear axle of the truck. The frame may include two downwardly extending vertically positioned legs having an adjustment means therein for varying the elevation of the fifth wheel, and may also contain a pair of spaced track means for receiving outwardly extending flanges on the respective legs and for rigidly securing the frame after an adjustment has been made longitudinally in the truck bed.

9 Claims, 11 Drawing Figures

PATENTED JUL 30 1974 3,826,516

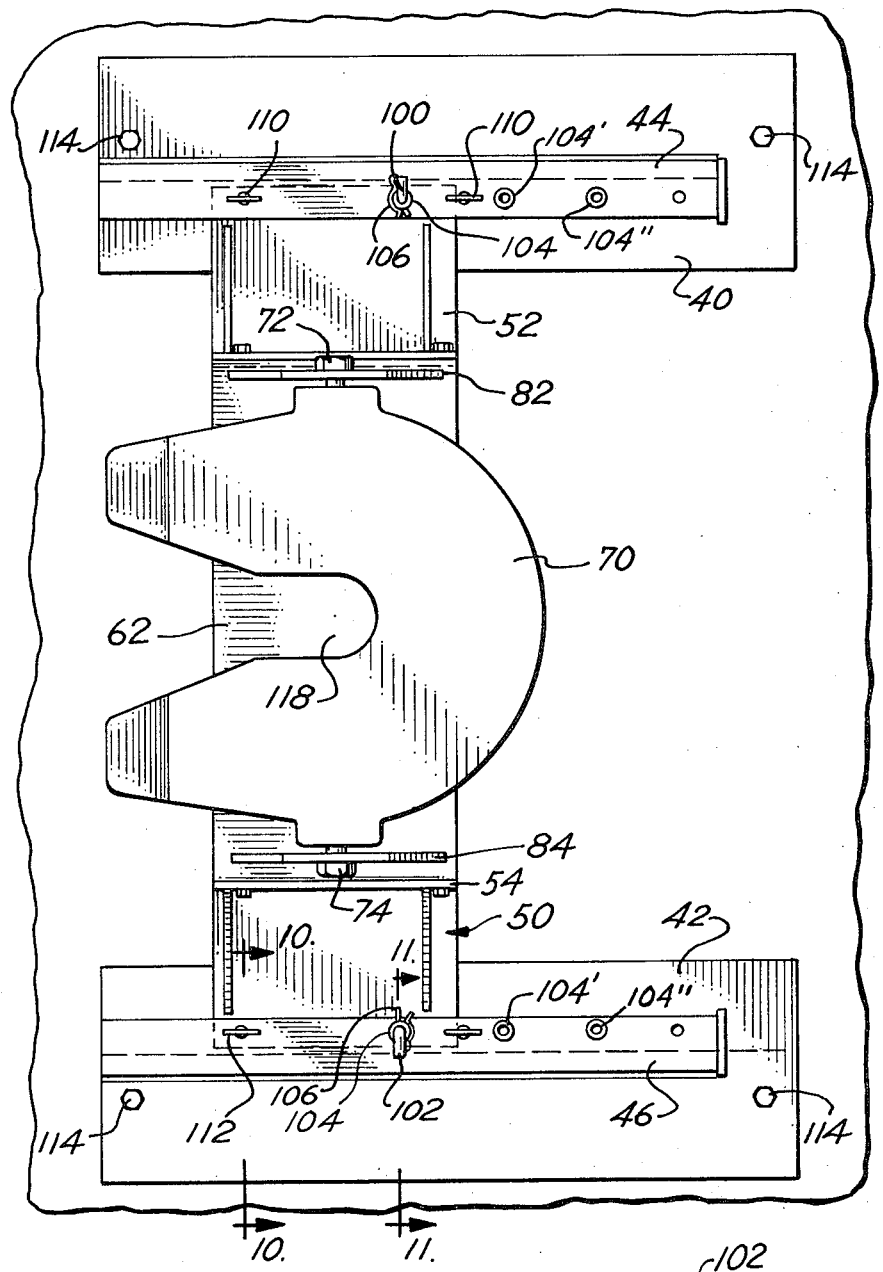

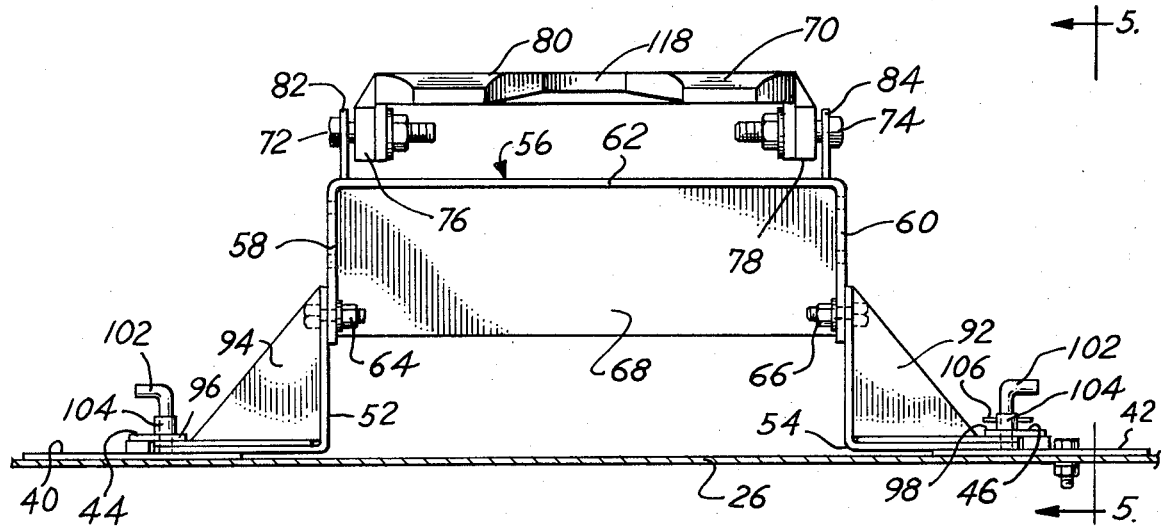
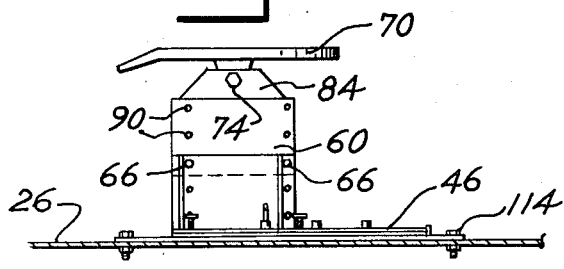
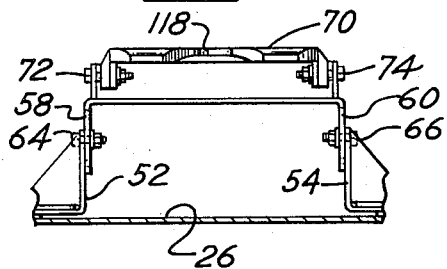
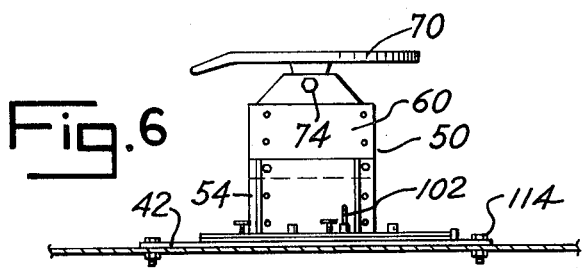
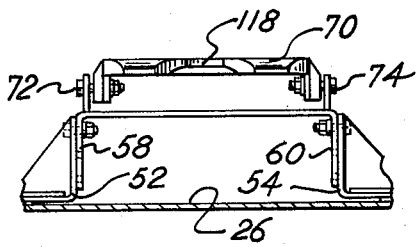
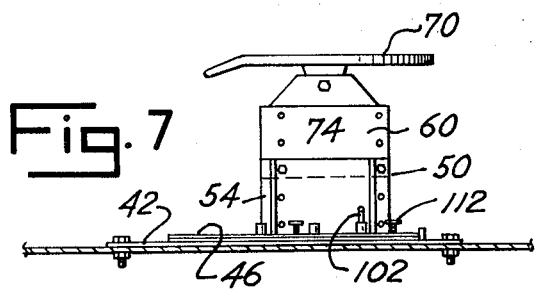

FIFTH WHEEL MOUNTING STRUCTURE

A type of trailer known as a fifth wheel recreational vehicle is towed by a pick-up truck and consists of a body having a single undercarriage with either single or dual axles and a front end which is connected to the truck by a fifth wheel structure mounted in the bed of the truck and supporting the forward end of the vehicle. The fifth wheel structure is secured to the bottom of the truck bed and the front of the vehicle extends over the tail gate and sides and is pivotally connected to the fifth wheel structure by a pin supported by a pin box secured to the underside of the forward end of the fifth wheel vehicle. While generally the combination of the pick-up truck and fifth wheel vehicle gives good stability and roadability and can be easily and reliably handled under all normal driving conditions when properly installed, difficulty is sometimes encountered in handling the vehicles, particularly under poor road and weather conditions, because of improper positioning and adjustment of the fifth wheel mounting structure in the truck bed or the poor distribution of the weight of the towed vehicle relative to the truck.

For example, if the fifth wheel is mounted too far to the rear of the rear axle of the truck, light front end and unstable steering conditions may exist. Conversely, if the wheel is too far forward of the rear axle, steering difficulty may also be encountered. Further, if the load in or on the towed vehicle is varied substantially, the pressure applied to the fifth wheel structure may be sufficiently different from that applied during the initial installation that instability or poor steering conditions may prevail, resulting in hazardous handling conditions. Also, if the forward end of the towed vehicle is too low, the distribution of weight on the trailer axle and tires, particularly with tandem axle undercarriages, will be unequal and may cause difficulty in handling both the towing vehicle and the fifth wheel trailer. It is therefore one of the principal objects of the present invention to provide a fifth wheel mounting structure which can be firmly secured to the bottom of the pick-up truck bed and thereafter adjusted either before or after the towed vehicle has been connected to the mounting structure, and which is reliable and safe to use and easy to install and service.

Another object of the invention is to provide a fifth wheel mounting structure which can readily be adjusted to raise and lower the forward end of the towed vehicle or to shift the mounting structure forwardly or rearwardly in the truck bed and relative to the rear axle to obtain optimum handling and driving performance of the truck and trailer, and which can readily and conveniently be installed in various makes of pick-up trucks and adapted to various types of towed vehicles.

Further objects and advantages of the present invention will become apparent from the following description and accompanying drawings, wherein:

FIG. 3 is a top plan view of the fifth wheel structure shown in FIGS. 1 and 2;

FIG. 4 is an elevational view of the fifth wheel structure shown in the preceding figures;

FIGS. 5, 6 and 7 are side elevational views of the fifth wheel structure illustrated in the preceding figures, showing the various positions of the wheel structure in the truck bed;

Figure 1:
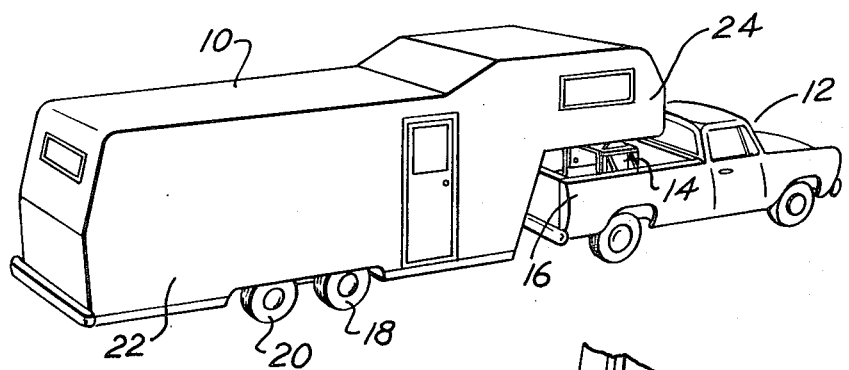
FIG. 1 is a perspective view of a pick-up truck and a fifth wheel trailer showing the present fifth wheel structure mounted in the bed of the truck and supporting the forward end of the trailer.
Figure 2:
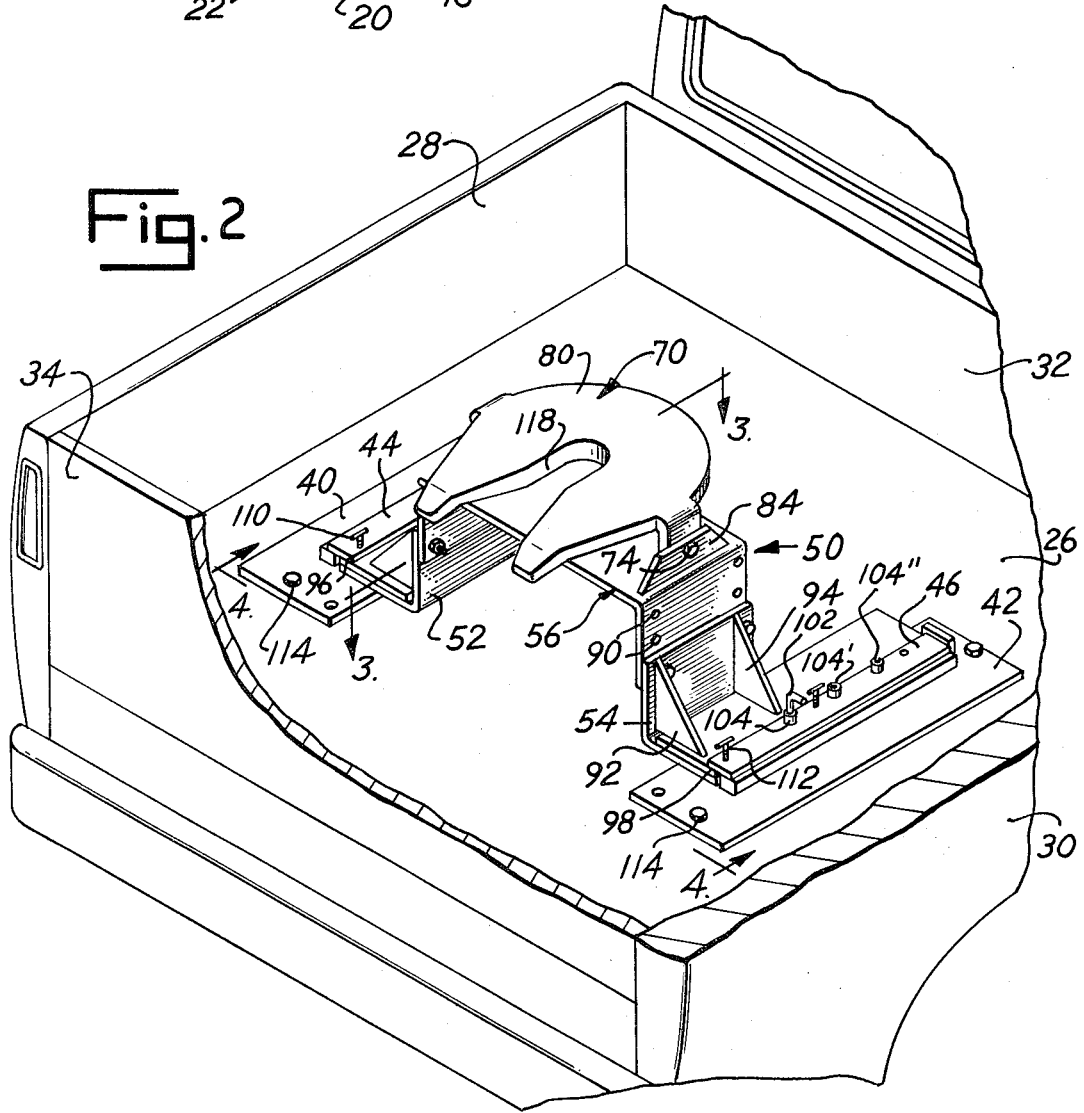
FIG. 2 is an enlarged perspective view of the bed of the pick-up truck shown in FIG. 1, with a portion thereof broken away to better show the fifth wheel structure mounted therein.

FIGS. 8 and 9 are end elevational views of the fifth wheel structure, showing the structure in two different elevated position adjustments; and FIGS. 10 and 11 are fragmentary vertical cross sectional views taken on line 10 — 10 and line 11 — 11, respectively, in FIG. 3.

Referring more specifically to the drawings, numeral 10 indicates generally a fifth wheel trailer connected to a pick-up truck 12 by a fifth wheel structure 14 mounted in bed 16 of the truck. The trailer is shown as a tandem axle type having a front and rear wheels 18 and 20 on the undercarriage, supporting a body 22 having an elevated forwardly projecting front end 24. Secured to the underside of the elevated forward end is a pin box and pin which extends downwardly and is adapted to connect directly with the fifth wheel structure to permit the truck to tow the vehicle and to permit the two vehicles to move angularly with respect to one another for negotiating turns and corners and facilitating parking. The construction of the trailer and truck shown in the drawings permits the truck to be turned to right angles in either direction with respect to the trailer. The trailer shown would normally be considered in the category of a recreational vehicle having one or more doors and a number of windows in the sides, and the truck may be considered a conventional pick-up truck of any one of the well known makes having a bed 16 with a bottom 26 on which the fifth wheel structure is mounted. The truck bed includes sides 28 and 30, forward end 32 and a tail gate 34.

The fifth wheel mounting structure consists of side plates 40 and 42 having mounted thereon tracks 44 and 46, respectively. A frame 50 is mounted between and supported by plates 40 and 42 and includes L-shaped brackets 52 and 54 and a body 56 having downwardly extending members 58 and 60 connected to a center plate 62. The two brackets 52 and 54 are secured rigidly to the two members 58 and 60 by a pair of bolts 64 and 66. The two downwardly extending members 58 and 60 are reinforced by a vertically positioned center plate 68 welded to the two members and to the underside of plate 62. A fifth wheel 70 is mounted on the frame by bolts 72 and 74 extending through downwardly extending members 76 and 78 joined integrally with platform 80 of the fifth wheel and through upstanding brackets 82 and 84 which are rigidly secured by welding or other suitable securing means to the upper side of plate 62. The two bolts are so connected to members 76 and 78 that the platform may tilt forwardly or rearwardly as the truck and trailer are driven over rises and depressions or hills and valleys on the road.

The frame is adjusted in height by the use of a plurality of holes 90 in each of the two downwardly extending members 58 and 60 through which bolts 64 and 66 are inserted in securing the members to the respective L-shaped brackets 52 and 54. The two brackets, which are provided with angular reinforcing members 92 and 94, when bolted to members 58 and 60 form a rigid structure for supporting the fifth wheel on plates 40 and 42.

The two tracks 44 and 46 are rigidly secured to plates 40 and 42 by welding or any other suitable securing means, and are provided with inwardly extending flanges 96 and 98 which extend over the outer edge or margin of brackets 52 and 54. The two brackets slide longitudinally along the track whenever an adjustment of frame 50 is to be made longitudinally in the truck bed. Locating pins 100 and 102 are provided on opposite sides of the frame and extend downwardly through flanges 96 and 98, respectively, and through holes in the margin of the respective brackets 52 and 54 and preferably into a corresponding hole in plates 40 and 42. Collars 104 are provided around each hole for locating pins 100 and 102 and the collars and pins have holes for receiving retaining pins 106, after the locating pins have been placed through the collars into the locating holes in the margins of the brackets.

In the installation and operation of the present fifth wheel mounting structure, plates 40 and 42 are bolted securely on the bottom 26 of bed 16 by a plurality of bolts 114 extending downwardly through the bottom and into the frame of the truck. The frame 50 of the mounting structure is mounted between tracks 44 and 46 by sliding the edges of brackets 52 and 54 beneath members 96 and 98. The frame is retained in one of the three positions indicated by the three collars 104, 104' and 104'' disposed along the track. After frame 50 has been properly located longitudinally along the track and the locator pins inserted in their respective holes, screws 110 and 112 are tightened to secure the frame in place. The trailer is then attached to the truck by first elevating the forward end 24 to such a position that the fifth wheel pin will slide in slot 118 of platform 80 where it will automatically be locked by a dog or pawl (not shown) on the plate, the plate being considered conventional in construction and operation, and hence not being described in detail herein. The trailer is then leveled by adjusting members 58 and 60 vertically relative to brackets 52 and 54, respectively. This vertical adjustment may be made either before or after connecting the trailer to the fifth wheel structure; however, the attitude of the trailer to the truck may not be readily determined until it has been connected to the wheel structure. If, after the trailer has been connected to the fifth wheel, a longitudinal adjustment is required in order to distribute the weight properly with respect to the rear axle of the truck, an adjustment can be made by loosening screws 110 and 112, removing the locating pins from the holes, and shifting frame 50 forwardly or rearwardly to another locating hole and inserting the pins therein and tightening the screws 110 and 112 to clamp the frame firmly in place. A vertical adjustment can also be made by removing bolts 64 and 66 and shifting members 58 and 60 upwardly or downwardly to different holes for the bolts and then reinserting and tightening the bolts.

By the use of the present fifth wheel mounting structure, which permits the fifth wheel pin center to be shifted forwardly or rearwardly with respect to the truck axle, and which permits the forward end of the trailer to be raised or lowered, optimum towing characteristics can be obtained for safe, comfortable and reliable driving. The adjustments may be made from time to time as weight conditions of the trailer and truck change, or as wear during operation modifies the towing characteristics.

While only one embodiment of the present fifth wheel mounting structure has been described in detail herein, various changes and modifications may be made without departing from the scope of the invention.

I claim:

1. A fifth wheel mounting structure for connecting a trailer and a pick-up truck having a bed with a bottom, comprising a frame having a body and a generally vertical leg on each side connected to said body, means in each leg for adjusting the length thereof to vary the height of said body, a means for pivotally mounting a fifth wheel platform on said body on an axis transverse to the truck, and a multiple position means for securing each of said legs to the bottom of the bed of the truck and for adjusting the position of said frame forwardly and rearwardly in the truck bed.

2. A fifth wheel mounting structure as defined in claim 1 in which said multiple position means for securing each of said legs to the bottom of the bed of the truck includes a plate secured to the bottom of the truck bed, a track on said plate, and a locating pin disposed along said track for engaging the respective leg.

3. A fifth wheel mounting structure as defined in claim 2 in which each of said legs is provided with a laterally extending flange and each of said tracks includes a flange extending over said first mentioned flange and a screw extends through said last mentioned flanges and engaging said first mentioned flanges for holding said frame in an adjusted position.

4. A fifth wheel mounting structure as defined in claim 1 in which each of said legs consists of a downwardly extending member connected to the ends of said body, an L-shaped bracket connected to the respective member, and a bolt extending through holes in said bracket and in said respective members for securing the bracket to the respective member in an adjusted position.

5. A fifth wheel mounting structure as defined in claim 3 in which each of said legs consists of a downwardly extending member connected to the end of said body, an L-shaped bracket connected to the respective member, and a bolt extending through holes in said bracket and in said respective members for securing the bracket to the respective member.

6. A fifth wheel mounting structure as defined in claim 1 in which each of said legs includes two vertically arranged parts, and said means in each of said legs for adjusting the length thereof includes a series of vertically arranged holes in one of said parts, a hole in the other said parts, and a bolt extending through the holes in said parts to connect said parts rigidly together in an adjusted position.

7. A fifth wheel mounting structure as defined in claim 3 in which each of said legs includes two vertically arranged parts, and said means in each of said legs for adjusting the length thereof includes a series of vertically arranged holes in one of said parts, a hole in the other said parts, and a bolt extending through the holes in said parts to connect said parts rigidly together in an adjusted position.

8. A fifth wheel mounting structure as defined in claim 1 in which said means for pivotally mounting the fifth wheel platform on said body includes two upstanding members spaced laterally from one another, parts extending downwardly from said platform adjacent respective upstanding members, and pivot means extending through said upstanding members and the respective downwardly projecting member to connect said platform to said frame.

9. A fifth wheel mounting structure as defined in claim 6 in which said means for pivotally mounting the fifth wheel platform on said body includes two upstanding members spaced laterally from one another, parts extending downwardly from said platform adjacent respective upstanding members, and pivot means extending through said upstanding members and the respective downwardly projecting member to connect said platform to said frame.

* * * * *